United States Patent
Beatty et al.

(10) Patent No.: US 8,405,262 B1
(45) Date of Patent: Mar. 26, 2013

(54) COOLING OF ELECTRIC MOTOR WITH COOLANT PIPE AND CONDUCTION PLATES OR CUPS

(75) Inventors: Reinhard Beatty, Blacksburg, VA (US);
Bradley A. Trago, Blacksburg, VA (US);
Gerald W. Brown, Radford, VA (US);
Ian Hovey, Christiansburg, VA (US);
Ron Bishop, Radford, VA (US)

(73) Assignee: Kollmorgen Corporation, Radford, VA (US)

( * ) Notice: Subject to any disclaimer, the term of this patent is extended or adjusted under 35 U.S.C. 154(b) by 0 days.

(21) Appl. No.: 13/307,711

(22) Filed: Nov. 30, 2011

(51) Int. Cl.
*H02K 9/19* (2006.01)
(52) U.S. Cl. .................... 310/58; 310/60 A; 310/64
(58) Field of Classification Search .............. 310/52, 310/54, 58, 60 A, 64; 29/596–598
See application file for complete search history.

(56) References Cited

U.S. PATENT DOCUMENTS

| | | | |
|---|---|---|---|
| 3,009,072 A * | 11/1961 | Mossay | 310/57 |
| 3,109,947 A | 11/1963 | Thompson et al. | |
| 3,414,749 A | 12/1968 | Abegg | |
| 5,448,118 A * | 9/1995 | Nakamura et al. | 310/54 |
| 5,747,900 A * | 5/1998 | Nakamura et al. | 310/58 |
| 5,886,433 A * | 3/1999 | Oda et al. | 310/59 |
| 6,201,321 B1 * | 3/2001 | Mosciatti et al. | 310/43 |
| 6,239,518 B1 * | 5/2001 | Matsubara et al. | 310/58 |
| 6,800,971 B1 * | 10/2004 | Mangold et al. | 310/52 |
| 6,819,016 B2 | 11/2004 | Houle et al. | |
| 7,042,124 B2 * | 5/2006 | Puterbaugh et al. | 310/89 |
| 2008/0185924 A1 * | 8/2008 | Masoudipour et al. | 310/54 |

* cited by examiner

Primary Examiner — Tran Nguyen
(74) Attorney, Agent, or Firm — Crowell & Moring LLP

(57) ABSTRACT

The stator of a fluid cooled electric machine, such as a motor, a generator, or a motor/generator assembly, includes an annular stator core including inwardly projecting teeth and external grooves in an outer surface of the core that are radially aligned with the teeth. Electrically conductive windings are mounted on the inwardly projecting teeth, and a pipe assembly for coolant has a pipe formed into a serpentine shape. The pipe includes axially extending pipe portions received in the external stator core grooves, and end turns interconnecting adjacent pairs of the axially extending pipe portions. Heat conduction elements are secured to the end turns of the coolant pipe, and a housing surrounding the outer surface of the stator core retains the axially extending pipe portions within the external grooves.

22 Claims, 4 Drawing Sheets

COOLING OF ELECTRIC MOTOR WITH COOLANT PIPE AND CONDUCTION PLATES OR CUPS

Cross-reference is made to commonly assigned, co-pending U.S. patent application Ser. No. 13/005,010, filed Jan. 12, 2011, titled COOLANT FLOW ENHANCING DEVICE FOR STATOR COIL END TURNS OF FLUID COOLED ELECTRIC MOTOR.

BACKGROUND OF THE INVENTION

1. Field of the Invention

This invention provides a way to cool a high power density electric machine in a cost-effective manner. Conventional arrangements for cooling such machines include cast metal housings with internal fluid cooling channels. These arrangements are expensive and difficult to manufacture. The invention concerns alternative arrangements that are low in both recurring and developmental costs.

2. Description of Related Art

U.S. Pat. No. 3,109,947 to Thompson et al. discloses several cooling systems for dynamoelectric machines in which heat dissipating structures include heat conductive members and coolant carrying tubes that are welded, brazed, or otherwise secured circumferentially to the heat conductive members.

U.S. Pat. No. 3,414,749 to Abegg concerns electric motor arrangements in which stator segment lamination stacks are secured together by fastening elements. The fastening elements are formed by dovetailed or cylindrical bars or rods, with conduits or bores in the bars or rods permitting coolant flow.

U.S. Pat. No. 6,819,016 to Houle et al. relates to liquid cooling arrangements for electric machines. Portions of cooling tubes are inserted into stator or heat storage element channels, and those portions are then deformed in order to facilitate their retention in the channels.

SUMMARY OF THE INVENTION

The U.S. patents identified above supply examples of arrangements having cooling tubes located outside of stator lamination stacks. One advantageous feature of the present invention concerns the use of a cooling tube outside of a lamination stack in conjunction with plates or cups to carry heat away from the stack and the coils wound on that stack to the cooling tube. Such a configuration is considered superior in efficacy for electric motors, generators, and motor/generators.

In one preferred form of the invention, the stator of a fluid cooled electric machine, such as a motor, a generator, or a motor/generator assembly, includes an annular stator core including inwardly projecting teeth and external grooves in an outer surface of the core that are radially aligned with the teeth. Electrically conductive windings are mounted on the inwardly projecting teeth, and a pipe assembly for coolant has a pipe formed into a serpentine shape. The pipe includes axially extending pipe portions received in the external stator core grooves, and end turns interconnecting adjacent pairs of the axially extending pipe portions. Heat conduction elements are secured to the end turns of the coolant pipe, and a housing surrounding the outer surface of the stator core retains the axially extending pipe portions within the external grooves.

The heat conduction elements could be plates joined to the end turns of the pipe, with each plate joined to one of the end turns and separated from all remaining plates. In this case, the pipe assembly can also include at least one additional heat conduction element secured to coolant supply and discharge sections of the pipe. In order to reduce eddy current losses in the plates, the plates can be provided with slits. Alternatively, the heat conduction elements could be cups within which end sections of the windings are received; in this case, the cups could contain slits as well. In this arrangement, a radially outer wall of each cup is preferably joined to the end turns of the pipe. A layer of electrically non-conductive material preferably coats the pipe and the plates or cups to insulate the copper end turns from the plates or cups.

An overall electric machine including such a stator and a process of making the stator are also referred to.

DETAILED DESCRIPTION OF THE INVENTION

Figure 1:
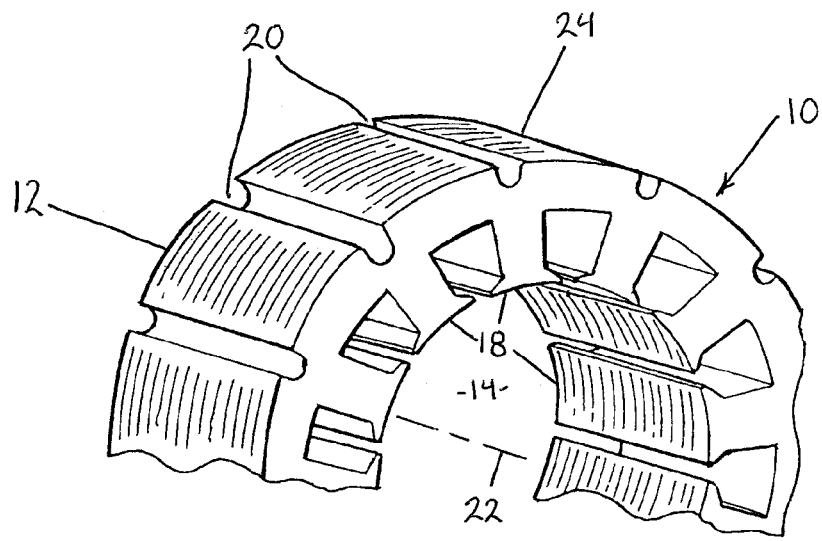
FIG. 1 is a partial view, in perspective, of a stator body having external grooves adapted to receive axially extending portions of a pipe for carrying coolant.
Figure 3:
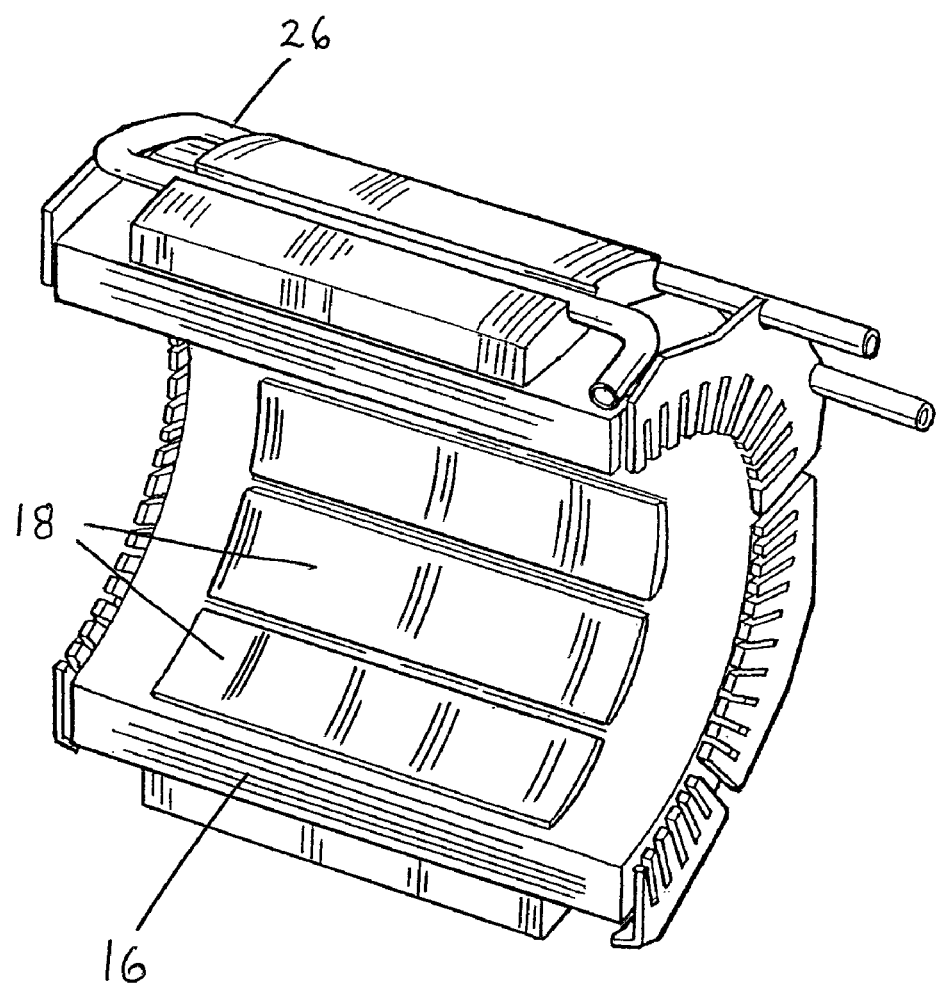
FIG. 3 is a view of a first embodiment of an armature arrangement, having axially extending pipe portions of the assembly shown in FIG. 2 received within the external grooves of the stator body.
Figure 4:
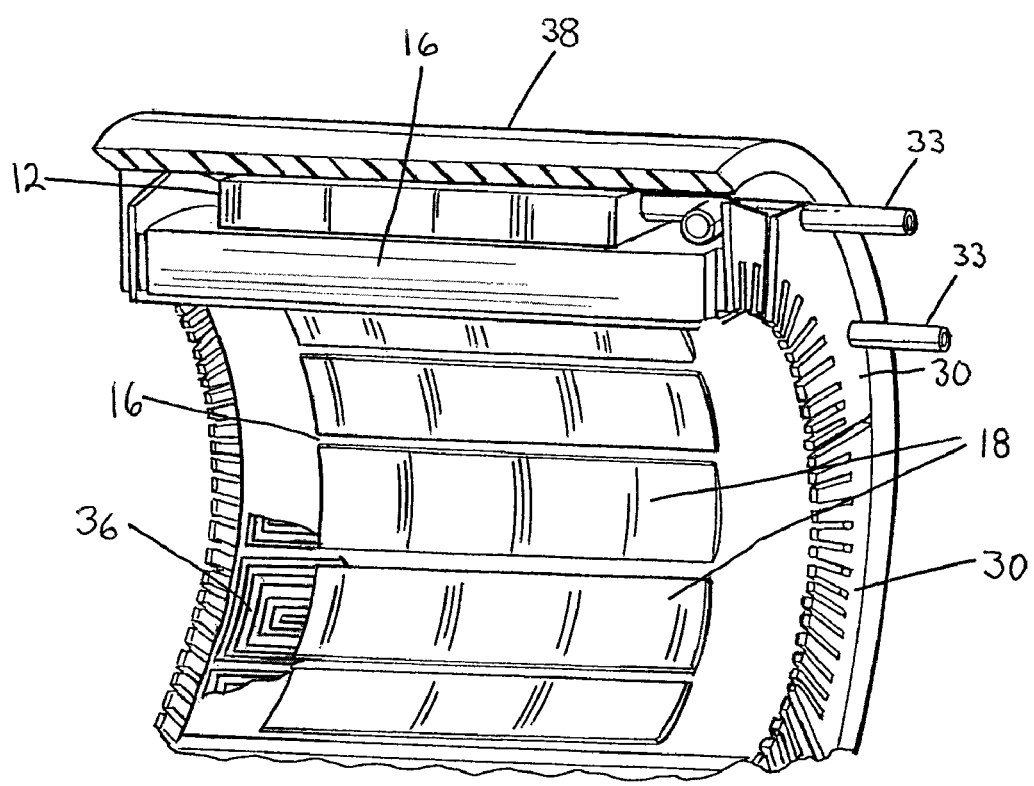
FIG. 4 is an illustration of an assembled stator produced by fitting a housing over the armature arrangement shown in FIG. 3.

FIG. 1 shows an annular stator core 10 produced from a multiplicity of individual sheet metal laminations collectively forming the stator body 12 of an overall stator arrangement. It is contemplated that the stator body 12 will become part of a fluid-cooled electric machine, which may be a motor, a generator, or a motor/generator assembly. The stator body 12 typically is composed of a stack of iron alloy (steel), nickel alloy, or cobalt alloy sheet laminations, which are bonded or secured together in a conventional manner. Each of the Thompson et al. ('947), Abegg ('749), and Houle et al. ('016) patents referred to utilizes laminations joined together in such a way, and the entire disclosure of each of the Thompson et al. ('947), Abegg ('749), and Houle et al. ('016) patents is incorporated herein by reference as non-essential subject matter. As will be recognized by those familiar with electric motors, generators, and motor/generators, the stator body 12 is usable together with a rotor, having permanent magnets appropriately distributed thereon or therein, that is secured for rotation within the central opening 14 of the stator body 12. The stator body 12 is also usable with non-permanent magnet machines. Insulated electrically conductive wire, forming windings or coils 16 (hereafter referred to as "windings" for simplicity) that are schematically shown in FIGS. 3-4, is wound around or otherwise fitted on radially inwardly projecting teeth 18 of the stator body 12 in a conventional manner.

FIG. 1 further illustrates a multiplicity of external grooves, indentations, or recesses 20 (hereafter referred to as "grooves" for simplicity) extending axially along the exterior of the stator body 12 in the same direction as, and preferably parallel to, a central stator axis 22. As shown, each of the grooves 20 has an approximately D-shaped cross section and projects inward from the radially outer surface 24 of the core 10. Each of the grooves 20, as illustrated, is centrally located over one of the stator teeth 18 so as to be radially aligned with the teeth, and extends inwardly from the stator surface 24 sufficiently far that each groove 20 can almost completely envelope the coolant pipe of a pipe assembly after the coolant pipe is placed within the groove in a manner to be described.

Figure 2:
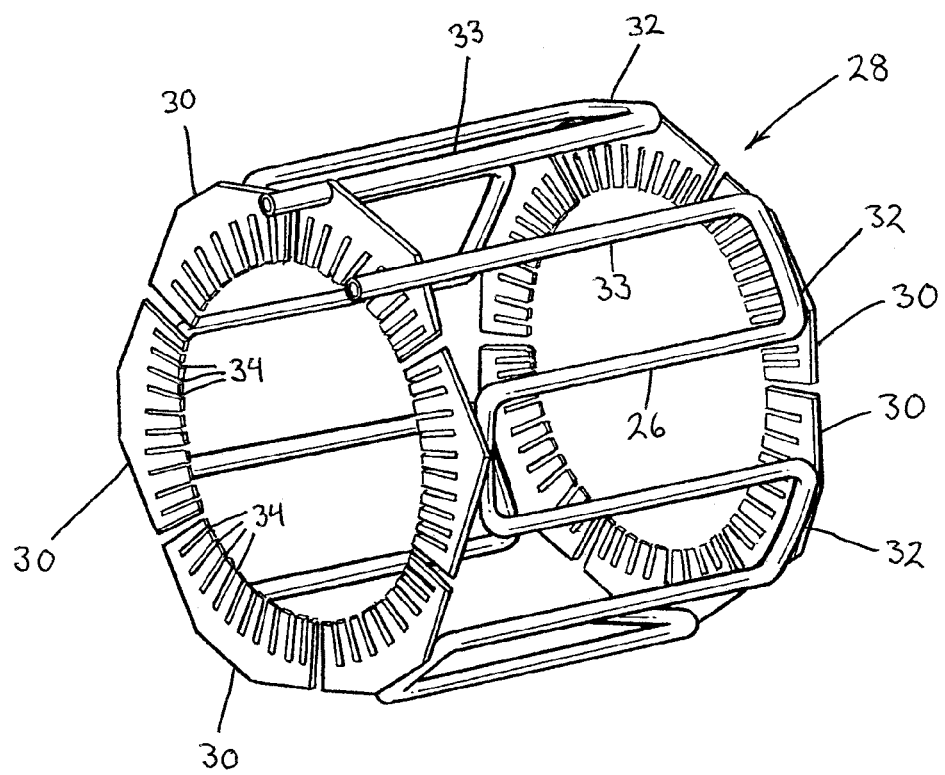
FIG. 2 is a view showing a pipe assembly incorporating a coolant fluid carrying pipe usable together with the stator body shown in FIG. 1.

To produce a pipe assembly 28 shown in FIG. 2, a thin-walled pipe 26 of copper or other suitable metal or metal alloy material is initially formed into a serpentine shape, and then is rolled or otherwise deformed into a cylindrical shape while maintaining the serpentine pattern. To produce an armature arrangement according to the first embodiment, a multitude of metal heat conduction plates 30 are brazed onto or otherwise joined to axially outer end turns 32 of the serpentine pipe 26 as shown in FIG. 2 in order to help conduct heat from the windings 16 and the stator teeth 18 more directly to the end turns 32 of the pipe 26 and, hence, to the coolant carried by the pipe. One heat conduction plate 30 is associated with each radially inwardly projecting tooth 18; accordingly, for the stator body 12 shown, which includes twelve inwardly projecting teeth 18, twelve individual plates 30, secured to each of eleven coolant pipe end turns 32 and to one set of coolant supply and discharge sections 33, are utilized. Each of the plates 30 is separate from adjacent neighboring plates 30, allowing the assembly to be flexible and easily installed. In the arrangement illustrated, the end turns 32 at each axial end of the pipe assembly 28 and the sections 33 support six separate plates 30, with the centers of plates 30 at one axial end of the pipe assembly 28 circumferentially staggered at roughly thirty degrees with respect to the centers of plates at the opposite axial end. Each of the individual plates 30 may include slits 34 to reduce eddy current losses in the plates 30 due to their close proximities to the windings 16. In the illustrated arrangement, each of the plates 30 includes roughly eight to ten such slits 34, equally spaced. The plates 30 may also be formed from stacks of laminations to further reduce eddy current losses.

Once the windings 16 are supplied to the stator teeth 18, to assemble the armature arrangement, one end of the pipe assembly 28 is expanded with tooling or in some other suitable fashion to such an extent that the expanded end of the pipe assembly is able to receive the stator core 10 having the windings 16. Once the stator core 10 and its associated windings 16 are enveloped by the pipe assembly 28, the supply and discharge sections 33 and the axially extending portions of the pipe 26 between the end turns 32 are inserted into the grooves 20 as the expanded end of the pipe assembly 28 is returned to a non-expanded condition. The pipe assembly 28 should be positioned such that the end plates 30 on opposite ends of the assembly 28 are essentially equidistant from the coil end sections 36 (FIG. 4) of the windings 16 protruding beyond axial ends of the stator body 12.

After being brazed or otherwise joined to the end turns 32 of the serpentine pipe 26, the pipe 26 and the plates 30 are insulated to help prevent shorting with the windings 16. Insulation is accomplished by encapsulating or otherwise coating the pipe 26 and the plates 30 with non-conductive material. Additional insulation may also be supplied to the windings 16 by way of this coating or encapsulating process. Encapsulation could occur either before or after the pipe assembly is joined together with the stator core 10 and its associated windings.

An overall stator is then assembled by shrink-fitting or press-fitting a largely cylindrical housing 38, shown in FIG. 4, over the armature arrangement. The shrink-fitting or press-fitting procedure serves to compress the axially extending portions of the pipe 26, including the coolant supply and discharge sections 33, into respective external grooves 20 and to trap the pipe assembly 28 in place. The resulting stator is subsequently encapsulated using a thermally conductive epoxy. In operation, coolant passing through the pipe 26 will serve to carry away heat generated in the armature arrangement.

Figure 5:
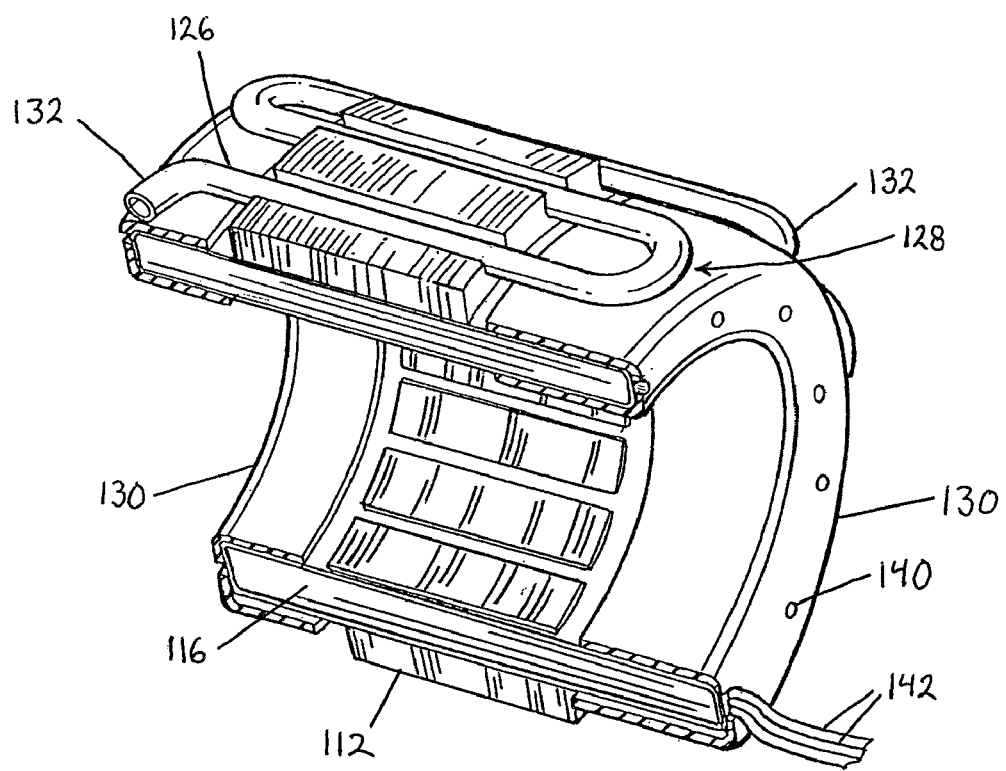
FIG. 5 is a view similar to FIG. 3 but showing a second embodiment of an armature arrangement.

FIG. 5 illustrates an alternate embodiment, in which end turns 132 at axial ends of a pipe assembly 128 are not provided with heat conduction plates. Instead, the pipe assembly 128 has opposing annular heat conductive cups 130 assembled over the coil end sections of windings 116 protruding beyond axial ends of a stator body 112. The cups 130 are located in close proximity to the end turns 132 of the pipe 126, so that the pipe 126 and the cups 130 can be bonded together and electrically insulated. The cups 130 will operate to conduct winding end turn heat to the sections of the pipe 126 that lie on the outside surfaces of the cups 130. The cups 130 have appropriately configured access openings 140 for winding leads 142 (not shown).

Again, the cups 130 can be slitted to reduce eddy currents in a manner similar to the flat plates 30. Slitting the cups 130, in fact, could be more important, although tests on a motor with cups indicated that the cups did not actually require slits.

A stator having cups 130 is actually likely to be more valuable that a stator including broken up flat plates, such as the plates 30 discussed initially in the application, since the cups are able to remove heat from the entire end turn of the stator instead of just the end faces. While many examples of placing tubing in stator slots for cooling are already available, the coils in these examples tend to become like a motor winding. Experiments with these configurations indicate that even though the tubing could be isolated electrically when connecting to the cooling system, the water itself may contain minerals that could become charged. This produces a concern regarding potential corrosion of the cooling components and so on. By putting the tubing at the back or outside of the stator body, away from the magnetic circuit, this problem is avoided. Use of the cups, again, appears to be of greater value, and is likely to be a very robust and cost effective method to make a liquid cooled motor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An electric machine stator that can be supplied with coolant, comprising:
    an annular stator core including inwardly projecting teeth and external grooves in an outer surface of the core that are radially aligned with the teeth,
    electrically conductive windings mounted on the inwardly projecting teeth,
    a pipe assembly including a coolant pipe formed into a serpentine shape, the pipe including axially extending pipe portions received in the external grooves and end turns interconnecting adjacent pairs of the axially extending pipe portions,
    heat conduction elements secured to the end turns of the coolant pipe, and
    a housing surrounding the outer surface of the stator core and retaining the axially extending pipe portions within the external grooves.

2. The stator of claim 1, wherein the heat conduction elements are plates joined to the end turns of the pipe.

3. The stator of claim 2, wherein each of the plates is joined to one of the end turns and is separated from all remaining plates.

4. The stator of claim 2, wherein each of the plates includes slits therein.

5. The stator of claim 1, wherein the heat conduction elements are cups within which end sections of the windings are received.

6. The stator of claim 5, wherein a radially outer wall of each cup is joined to the end turns of the pipe.

7. The stator of claim 2, further comprising a layer of electrically non-conductive material coating the pipe and the plates.

8. The stator of claim 3, wherein each of the plates includes slits therein.

9. The stator of claim 5, wherein each of the cups includes slits therein.

10. An electric machine including a stator that can be supplied with coolant, comprising:
    an annular stator core including inwardly projecting teeth and external grooves in an outer surface of the core that are radially aligned with the teeth,
    electrically conductive windings mounted on the inwardly projecting teeth,
    a pipe assembly including a coolant pipe formed into a serpentine shape, the pipe including axially extending pipe portions received in the external grooves and end turns interconnecting adjacent pairs of the axially extending pipe portions,
    heat conduction elements secured to the end turns of the coolant pipe, and
    a housing surrounding the outer surface of the stator core and retaining the axially extending pipe portions within the external grooves.

11. The electric machine of claim 10, wherein the heat conduction elements are plates joined to the end turns of the pipe.

12. The electric machine of claim 11, wherein each of the plates is joined to one of the end turns and is separated from all remaining plates.

13. The electric machine of claim 11, wherein each of the plates includes slits therein.

14. The electric machine of claim 10, wherein the heat conduction elements are cups within which end sections of the windings are received.

15. The electric machine of claim 14, wherein a radially outer wall of each cup is joined to the end turns of the pipe.

16. The electric machine of claim 14, wherein each of the cups includes slits therein.

17. The electric machine of claim 11, further comprising a layer of electrically non-conductive material coating the pipe and the plates.

18. A process of making an electric machine stator that can be supplied with coolant, comprising:
    providing an annular stator core, including inwardly projecting teeth and external grooves in an outer surface of the core that are radially aligned with the teeth, and with electrically conductive windings mounted on the inwardly projecting teeth,
    expanding an end of a pipe assembly, including a coolant pipe formed into a serpentine shape, axially extending pipe portions interconnecting end turns of the pipe, and heat conduction elements secured to the end turns,
    introducing the stator core into the pipe assembly by way of the expanded end,
    returning the end of the pipe assembly to a non-expanded condition, thereby moving the axially extending pipe portions into the external grooves, and
    fitting a housing over the outer surface of the stator to retain the axially extending pipe portions within the external grooves.

19. The process of claim 18, wherein the heat conduction elements are plates.

20. The process of claim 19, wherein each of the plates includes slits therein.

21. The process of claim 18, wherein the axially extending pipe portions are compressed into the external grooves as the housing is fitted over the outer surface of the stator.

22. The process of claim 18, wherein the pipe assembly further includes at least one additional heat conduction element secured to coolant supply and discharge sections of the pipe.

\* \* \* \* \*